Patented June 15, 1926.                                                1,589,171

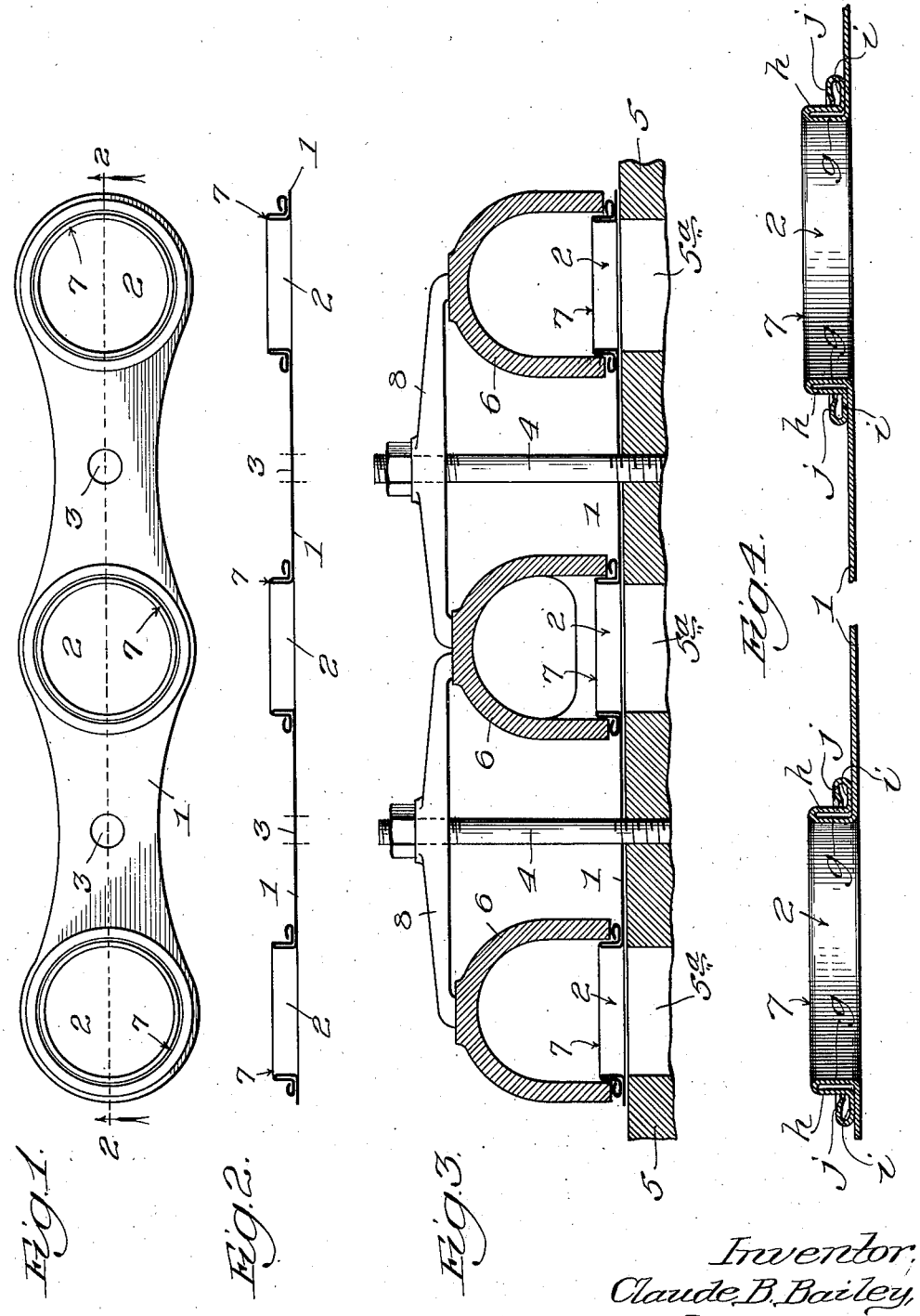

UNITED STATES PATENT OFFICE.

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE.

GASKET.

Original application filed May 20, 1925, Serial No. 31,484. Divided and this application filed July 18, 1925. Serial No. 44,490.

This invention relates to manifold gaskets, such as are in elongated or strip form and have a row of port and stud holes spaced apart lengthwise of the gasket body so that single gaskets may accommodate a plurality of port openings in the cylinder block and associated manifolds. The stud holes are smaller than the port holes and are between them so that the studs of the manifold clamps may extend through the gaskets and support them in place on the cylinder block.

In my copending application Serial No. 31,484, filed May 20, 1925, and of which the present application is a division, I have disclosed and claimed a gasket of this general type having its body portion and tubular guides and pressure receiving portions about the port holes entirely of sheet metal so as to reduce the cost of the gasket structure and simplify the same by eliminating the use of asbestos and additional metal layers extending over the entire area of the gasket, as heretofore.

The object of the present invention is to fold up these pressure receiving portions and guides from the single metal layer of the gasket so that the latter will have all its parts integrally connected and formed from a single piece of sheet metal, thereby avoiding blow-outs by having no loose or separate parts.

In the accompanying drawings—

Fig. 1 is a top plan view of a manifold gasket constructed in accordance with my invention;

Fig. 2 is a longitudinal sectional view through the gasket on line 2—2 of Fig. 1;

Fig. 3 is a sectional view showing the gasket clamped in place between a cylinder block and its associated manifold pipes; and Fig. 4 is a fragmentary vertical sectional view through the gasket on a large scale.

The manifold gasket of my invention has a relatively narrow elongated body portion 1 made from a single layer or piece of sheet metal, such as copper, brass, aluminum, zinc, or other suitable material. Said body is provided with a row of port holes 2, 2 spaced apart lengthwise of the gasket body, as shown in Figs. 1 to 3. The gasket body is provided between the port holes 2 with smaller holes or openings 3, 3 to receive studs or bolts 4 for holding the gasket in position on the cylinder block 5 and when applying the manifold pipes 6, 6 thereto.

The gasket is provided with a plurality of combined pressure receiving portions and tubular guides 7, 7 carried by the gasket body 1 at each of the port holes 2, 2 and completely surrounding the same. These portions 7 are made integral with the metal layer of the gasket by flanging up and suitably folding or turning the metal about the respective port holes 2, 2. This provides each tubular guide with double or inner and outer flanges $g$, $h$, as clearly shown in Fig. 4. These flanges $g$, $h$ extend outward from the body 1 on one side thereof and are substantially at right-angles thereto so as to enter the openings in the associated manifold pipe 6 and guide the same into register with the associated cylinder port $5^a$, as shown in Fig. 3. These flanges $g$, $h$ are integrally connected by the fold of the metal at their outer edges, and the lower marginal portion of the outer flange $h$ is provided with an outwardly projecting base flange $i$ overlapping or close to the body layer 1, as shown in the drawings. This base flange $i$ is folded or doubled over on itself, as at $j$, to provide, in conjunction with the body layer 1, three thicknesses of sheet metal for the pressure receiving portion or cushion of the gasket.

The gasket shown in the drawings has three port holes 2, 2 to accommodate three manifold pipes 6, 6 and their associated cylinder ports $5^a$, $5^a$. The guides 7 extend outward from the gasket and enter the manifold pipes and guide the same into proper register with the cylinder ports, the flanges $i$ and $g$ and the body portion 1 behind the same making the cushion to receive the clamping pressure exerted on the pipes 6, 6 by the usual manifold clamps 8, 8.

The gasket is made entirely of sheet metal and all of its parts are integral, thereby simplifying the structure and reducing its cost of manufacture. The pressure receiving portions are entirely of sheet metal, thereby avoiding the use of asbestos or other packing material, as heretofore. These portions, in immediately surrounding the respective port holes, allow for concentration of the clamping at the port holes and avoid wasting of such pressure by distributing the same over the entire area of the gasket as heretofore. This allows tight joints, especially at high pressure ones, to be made with less pressure than heretofore. The result is that either smaller studs or bolts may be used, or the same studs with less tension or strain on them.

I claim as my invention:

1. A manifold gasket, having an elongated body made entirely of sheet metal with a plurality of port holes therein spaced apart lengthwise of the gasket body, and a plurality of tubular guide members carried by the body at the respective port holes and bent into folded form from the metal of the body at the port holes, said guides extending outward from the gasket body and having the fold in the metal at the outer edges thereof.

2. A manifold gasket, having an elongated body made entirely of sheet metal having a row of port and stud holes therein spaced apart lengthwise of the gasket body with the stud holes smaller than the port holes and between them, and a plurality of tubular guides carried by the body at the respective port holes and extending outward from one side of the body, said guides being bent into folded form from the metal of the body at the port holes and having inner and outer flanges.

3. A manifold gasket, having an elongated body made entirely of sheet metal with a row of port and stud holes therein spaced apart lengthwise of the gasket body with the stud holes smaller than the port holes and between them, and a plurality of tubular guides carried by the body at the respective port holes and extending outward from one side of the body, said guides being bent into folded form from the metal of the body at the port holes and having inner and outer flanges, said outer flanges having folded marginal portions lying adjacent the side of the body from which the guides extend.

In testimony whereof, I affix my signature this 10 day of July, 1925.

CLAUDE B. BAILEY.